Patented Dec. 14, 1926.

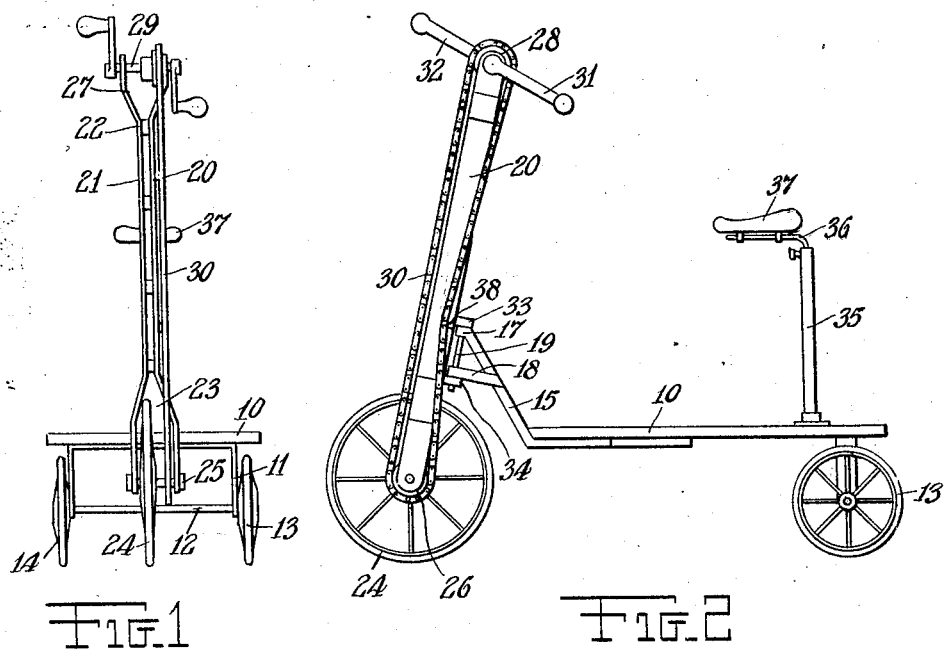

1,610,478

UNITED STATES PATENT OFFICE.

PAUL SCHIMMEL AND CURT RUDOLF GEDAT, OF NEW YORK, N. Y.

VELOCIPEDE.

Application filed February 2, 1926. Serial No. 85,433.

The main object of this invention is to provide a velocipede suitable for use for children having for its main features a self-propelling unit and means for permitting directional maneuvering.

Another object is to provide a modified type of velocipede having a gear driven propulsion means mounted upon the front steering truck of the vehicle.

The above and other objects will become apparent in the description below, in which characters of reference refer to like-named parts in the drawing.

Referring briefly to the drawing, Figure 1 is a front elevational view of the preferred form of velocipede.

Figure 2 is a side elevational view of the same.

Referring in detail to the drawing, the numeral 10 indicates a platform upon which the operator of the vehicle is supported. This platform has a U-shaped frame suspended from its rear end whose arms 11 form a support for a shaft 12 on which wheels 13 and 14 are mounted. At the front end of the platform, an angular frame 15 is fixed. Said frame has a sleeve 17 and an additional strap 18 also provided with the sleeve which are adapted to receive a king bolt 19 when coupling the platform to the pivoted carriage of the vehicle. The pivoted carriage comprises a pair of inclined vertical straps 20 and 21 which are connected at intermediate positions by lugs 22. The straps 20 and 21 are spread apart at their upper and lower ends to provide spaces of substantial dimension to permit mounting of the propeller mechanism. In the space 23 between the straps 20 and 21 at the lower end thereof, a wheel 24 is mounted on an axle 25. A sprocket wheel 26 is also rigidly mounted on the axle 25 and is adapted to rotate both the axle and wheel when acted upon. In the space 27 between the upper ends of the straps 21 and 20, an additional sprocket wheel 28 is fixed on a spindle 29. A sprocket chain 30 is trained about the sprocket wheels 26 and 28, as illustrated in Figure 2 and on the spindle 29, a pair of crank handles 31 and 32 are fixed, the crank handles serving as a means by which the entire vehicle is propelled. Near the lower end of the straps 20 and 21, a pair of lugs 33 and 34 are provided. These lugs are spaced apart a sufficient distance to permit the insertion of members 17 and 18 therebetween and are provided with openings thru which a king bolt 19 passes, the king bolt serving to couple the pivoted carriage to the platform or body of the vehicle.

On the rear portion of the platform 10, an upright tube 35 is fixed. This tube receives one end of a resilient support 36 on which a seat member 37 is mounted.

The structure described refers to the preferred type of vehicle having a chain drive propulsion means which is provided with means for permitting a substantial rotation of the pivoted carriage. To prevent interference of the chain 30 when the vehicle is making a left hand turn, a roller 38 is mounted on the strap 20 and around one side of this roller, a chain is guided in deflected position so that the chain at this point does not interfere with the pivoting of the front carriage of the vehicle.

This invention proposes to provide a toy vehicle suitable for use by children, which is completely mobile and may be maneuvered in any direction. The vehicle is capable of making small turns. The operator of the vehicle seats himself upon member 37, placing the feet upon the platform 10 and grasps the handles on the crank arms 31 and 32. Rotating these crank arms causes the chain to transmit rotation from the sprocket wheel 28 to the sprocket wheel 26. This sprocket wheel being fixed on the axle 25 rotates the traction wheel 24, giving mobility to the vehicle. The sprocket chain is deflected intermediate its length at a position where the king bolt couples the rear body to the pivoted carriage by a roller 38 so that the pivoted carriage may be rotated approximately 90 degrees toward the left. The pivoted carriage is coupled to the rear body of the vehicle in both the preferred and modified forms by the king bolt 19.

We claim:—

1. In a vehicle, a wheeled rear body, a seat structure thereon, a pivoted front carriage, a king bolt coupling said front carriage and rear body, a traction wheel supporting the pivoted carriage, means on said pivoted carriage for rotating the traction wheel supporting the same comprising an axle supporting said traction wheel on the pivoted carriage, a sprocket wheel mounted on said axle, a crank shaft at the upper end of said pivoted carriage, a sprocket wheel mounted thereon, a chain connecting said sprocket wheels, crank arms on said crank shaft, said chain being an endless member, one side of said chain projecting beyond the axis of the king bolt connecting said pivoted carriage to the rear body, and rotatable means mounted on said pivoted carriage in the region of the king bolt for deflecting one side of said chain toward the opposite side of said chain when passing said king bolt to permit a 90 degree rotation of said pivot carriage with respect to the wheeled rear body.

2. In a vehicle, a wheeled rear body, a seat structure thereon, a pivoted front carriage, a king bolt coupling said front carriage and rear body, a traction wheel supporting the pivoted carriage, means on said pivoted carriage for rotating the traction wheel supporting the same comprising an axle supporting said traction wheel on the pivoted carriage, a sprocket wheel mounted on said axle, a crank shaft at the upper end of said pivoted carriage, a sprocket wheel mounted thereon, a chain connecting said sprocket wheels, crank arms on said crank shaft, means for deflecting said sprocket chain to permit a 90 degree turn of said pivoted carriage comprising a roller mounted intermediate the height of said carriage adapted to deflect one length of the sprocket chain in the region of the king bolt to prevent interference of the sprocket chain with the king bolt when the pivoted carriage is rotated 90 degrees toward the left.

In testimony whereof we affix our signatures.

PAUL SCHIMMEL.
CURT RUDOLF GEDAT.